(No Model.) 2 Sheets—Sheet 2.
F. G. WISELOGEL.
SEWAGE FILTERING APPARATUS.
No. 545,030. Patented Aug. 20, 1895.
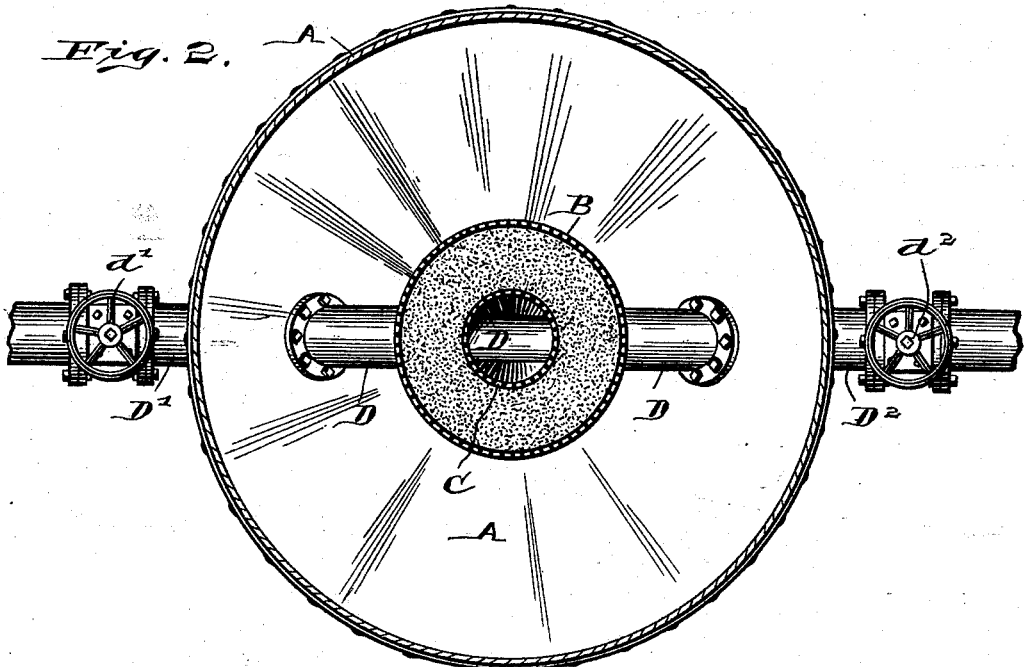
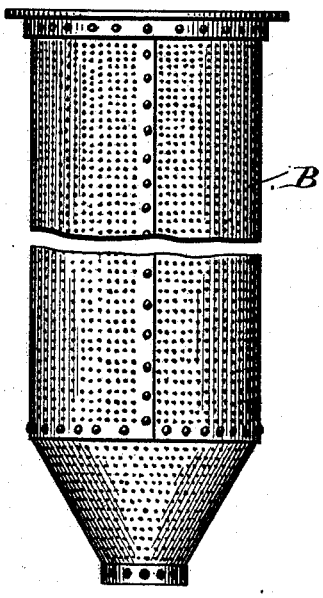
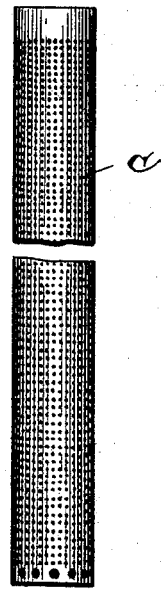
WITNESSES:
INVENTOR
Frederick G. Wiselogel,
BY
Chester Bradford,
ATTORNEY.

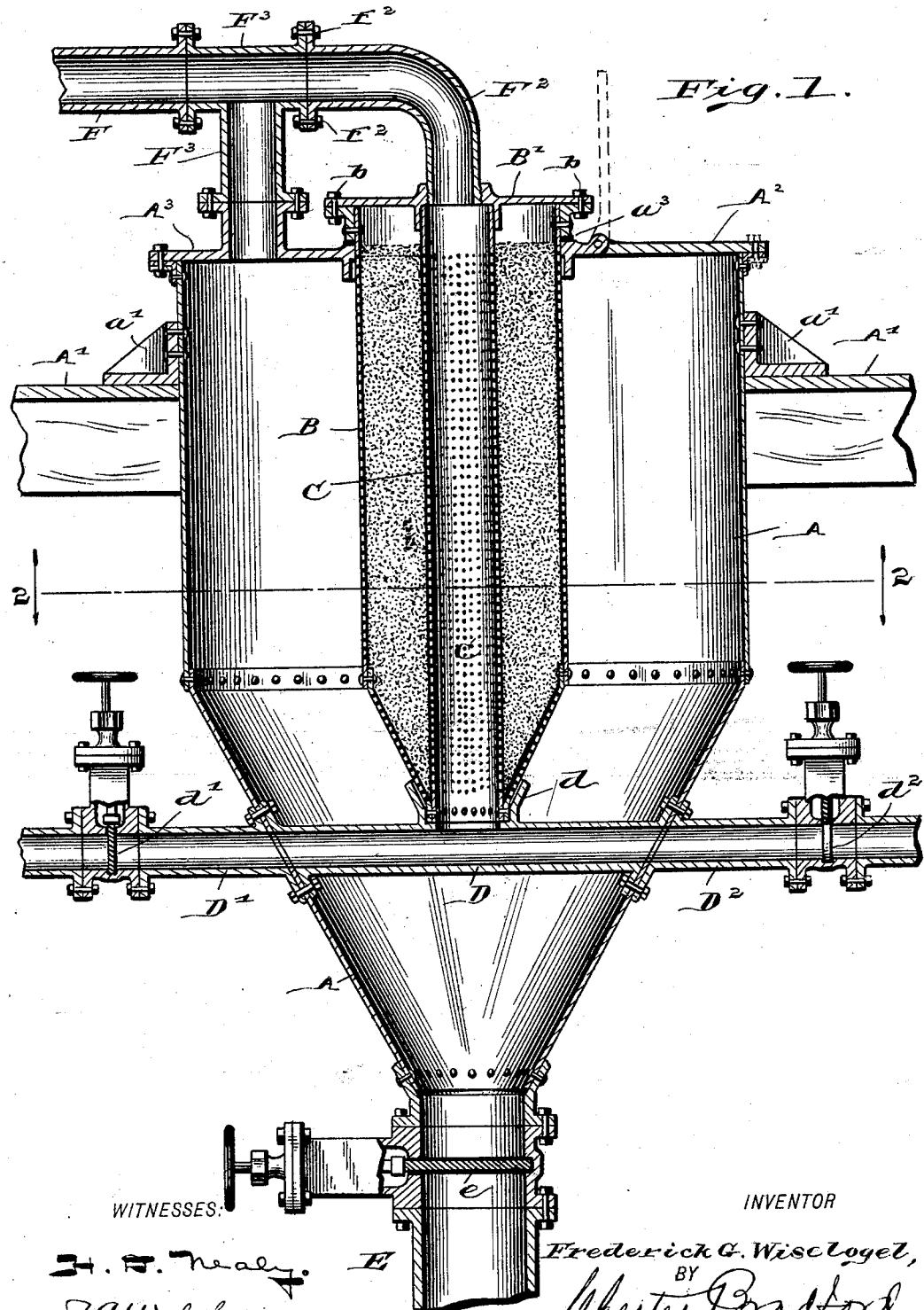

UNITED STATES PATENT OFFICE.

FREDERICK G. WISELOGEL, OF INDIANAPOLIS, INDIANA.

SEWAGE-FILTERING APPARATUS.

SPECIFICATION forming part of Letters Patent No. 545,030, dated August 20, 1895.

Application filed February 26, 1895. Serial No. 539,805. (No model.)

*To all whom it may concern:*

Be it known that I, FREDERICK G. WISE-LOGEL, a citizen of the United States, residing at Indianapolis, in the county of Marion and State of Indiana, have invented certain new and useful Improvements in Sewage-Filtering Apparatus, of which the following is a specification.

The object of my said invention is to produce an apparatus by which liquid can be filtered from solid sewage matter and afterward properly treated, while the noxious gases and other products are at the same time effectually disposed of. Such an apparatus or filter will be first fully described, and the novel features thereof then pointed out in the claims.

Referring to the accompanying drawings, which are made a part hereof and on which similar letters of reference indicate similar parts, Figure 1 is a central vertical sectional view of an apparatus or filter embodying my said invention; Fig. 2, a horizontal sectional view looking downwardly from the dotted line 2 2 in Figs. 1 and 3; and Figs. 3 and 4 detached views of the outer and inner casing of the filter proper, respectively.

In said drawings the portions marked A represent the outer casing or tank of my improved apparatus; B, the outer casing of the filtering device; C, the inner casing thereof; D, a discharge-pipe for the fluid matter; E, a discharge-pipe for the solid matter, and F a discharge-pipe for the gases.

The casing or tank A is of considerable size, and is shown as supported by brackets $a'$ upon a floor $A'$. It is provided at the top with a hinged door $A^2$, through which the sewage matter or garbage is to be introduced. It is hopper-shaped and converges toward the bottom, where it is connected to the upper end of the pipe E. It is provided with a top $A^3$, which can be removed, if desired, and in this top is a door $A^2$, as shown.

The filter proper is composed of the two cylindrical structures B and C, one arranged inside of the other, with filtering material between them, both said cylinders being perforated. The structure as a whole rests in an opening formed therefor in the top $A^3$, out through which it is easily removable, a tight joint being secured by means of packing $a^3$. The cylinder C is entirely open in the inside, and at the lower end connects with the pipe D, while at the upper end it connects with an elbow $F^2$ leading to the T $F^3$, which in turn is connected to the pipe F. By uncoupling the elbow $F^2$ from the T $F^3$ (by removing the bolts $f^2$ or otherwise) the whole filter can be readily lifted out for purposes of cleaning or repair, as it rests loosely in a socket $d$ formed for the purpose in connection with that portion of the pipe or tube D which is inside the structure A. By removing the top $B'$, which can easily be done by taking out the bolts $b$, access is had to the interior of the filter, as will be readily understood.

The pipe D extends through the structure A, preferably substantially horizontally, and preferably continues out at both sides of said structure by means of the continuation-pipes $D'$ and $D^2$, although, obviously, one connection is sufficient for mere filtering purposes. Inserted in these continuation-pipes are the valves $d'$ and $d^2$, by which the passage in either direction can be closed. Commonly, one of these pipes leads to the sewer, and its valve should normally be open; while the other is adapted to be connected to a steam or water pipe, forming a means for the purpose of cleaning out the apparatus. Assuming that the liquid matter ordinarily runs off through the continuation-pipe $D^2$, the valve $d^2$ would ordinarily be open and the valve $d'$ closed. The liquid would then filter in into the inside of the cylinder C and thence run down into the pipe D and out through the pipe $D^2$ freely. When the filter becomes foul, however, it can be easily washed out by closing the valve $d^2$, opening the valve $d'$, and connecting a water-pipe thereto, as will be readily understood. This connection is also of value in the treatment of offal from hospitals, as a jet of steam can be turned into the apparatus therethrough and the microbes thus destroyed.

The pipe E may lead to a drier, such, for instance, as shown in my pending applications, Serial No. 523,276, filed September 17, 1894, and Serial No. 537,123, filed February 2, 1895. It is provided with a valve $e$, and this, during the ordinary operation of the apparatus, is kept closed, so that the solid matter will accumulate in the bottom of the structure A, while the liquid matter filters through and runs off, as above described. After a certain period, however, when the structure A has become as full of solid matter as is desired, further introduction of such matter is for the time suspended and the valve e opened, when the comparatively solid matter is discharged into the drier, after which the valve e is closed and the apparatus is ready for further use.

The pipe F leads preferably to an exhaust-fan, which is intended to discharge into a furnace, whereby all noxious vapors and gases are drawn from the apparatus through the pipe F, by means of its connections $F^2$ and $F^3$, and carried off and destroyed or rendered harmless. This double connection to the apparatus, one by means of the elbow $F^2$ to the upper end of the cylinder C and the other by means of the T $F^3$ to the main tank, renders this device exceedingly efficient in this particular.

The operation is as follows: The matter to be treated—such as garbage, night-soil, and other sewage-matter—is dumped or run into the tank A. I have illustrated a construction especially adapted to receive it from wagons, from which it may be dumped in through the door $A^2$, the floor A' being suitable for teams to drive upon, and the height of the apparatus above said floor being suitable to receive the discharge from dumping carts or wagons. As is well known, carts or wagons for this purpose are usually liquid-tight. There is usually a large proportion of liquid in such matter, which would render it exceedingly difficult to dry the mass if it was thrown directly into a drier.

My apparatus serves to separate a very large proportion of the liquids from the solids, as has already been described, thus leaving the solids in better condition for the drier, while the liquid is drawn off and run to the sewer or elsewhere, and the gases are drawn off and consumed.

Having thus fully described my said invention, what I claim as new, and desire to secure by Letters Patent, is—

1. The combination, in a sewage filter, of the main tank or structure, a filter structure centrally positioned therein having an open cylindrical center, a pipe leading off whereby the noxious gases are exhausted, and connections from said pipe both to said filter and to the main tank direct, substantially as shown and described.

2. The combination, in a sewage filter, of the main hopper-shaped tank provided with a closable top, a fluid drain-pipe passing through said tank with which a central filter may be connected, and said central filter composed of an inner and outer shell with filtering material between them, the outer shell being tapered at the bottom and united to the inner shell, a support for said filter upon said drain-pipe, and means for readily disconnecting and removing said filter through the top of the main outer tank, substantially as shown and described.

3. The combination, in a sewage filter, of the main structure or tank A, a central filter composed of perforated cylinders B and C with filtering material between them, the pipe D to which the lower end of the filtering cylinder is connected, continuation pipes connected to said discharge pipe, a main discharge pipe E connected to the bottom of the tank and provided with a valve e, and a gas exhaust pipe F connected to the upper end of the apparatus, substantially as shown and described.

In witness whereof I have hereunto set my hand and seal, at Indianapolis, Indiana, this 20th day of February, A. D. 1895.

FREDERICK G. WISELOGEL. [L. S.]

Witnesses:
CHESTER BBADFORD,
JAMES A. WALSH.